(12) United States Patent
Bourrieres et al.

(10) Patent No.: US 7,647,279 B2
(45) Date of Patent: Jan. 12, 2010

(54) METHOD TO MAKE TRANSACTIONS SECURE BY MEANS OF CARDS HAVING UNIQUE AND NON-REPRODUCIBLE IDENTIFIERS

(75) Inventors: Francis Bourrieres, Montauban (FR); Clement Kaiser, Montauban (FR); Frank Bourrieres, Montauban (FR)

(73) Assignee: Novatec SA, Montauben (FR)

( * ) Notice: Subject to any disclaimer, the term of this patent is extended or adjusted under 35 U.S.C. 154(b) by 1032 days.

(21) Appl. No.: 10/712,659

(22) Filed: Nov. 13, 2003

(65) Prior Publication Data

US 2005/0075984 A1    Apr. 7, 2005

(30) Foreign Application Priority Data

Oct. 2, 2003    (FR) .................................. 03 11527

(51) Int. Cl.
G06Q 30/00    (2006.01)
G06Q 20/00    (2006.01)
(52) U.S. Cl. .............................. 705/67; 705/64; 713/185
(58) Field of Classification Search .................. 705/67; 713/182, 185
See application file for complete search history.

(56) References Cited

U.S. PATENT DOCUMENTS 5,657,389 A * 8/1997 Houvener ................... 713/186
6,584,214 B1 * 6/2003 Pappu et al. ................ 382/108
2003/0014647 A1    1/2003 Bourrieres et al. .......... 713/185

FOREIGN PATENT DOCUMENTS

| GB | 2304077 | * | 3/1997 |
| GB | 2324065 | * | 10/1998 |

* cited by examiner

Primary Examiner—Andrew J. Fischer
Assistant Examiner—Christopher C Johns
(74) Attorney, Agent, or Firm—Vidas, Arrett & Steinkraus

(57) ABSTRACT

A method for making transactions secure based upon a card-type medium (2) comprising a number (4) and a remote database (5) connected to a telecommunications network. A unique and non-reproducible identifier (3) in the form of a bubble code is physically affixed to the card (2) comprising a number (4) contained either on a magnetic strip, of a bar code, or in an electronic label. One representation of this identifier (6) and or (7) is stored in the remote database (5) at the same number (4) as that present on the medium. This identifier (3) constitutes an unforgeable link between the magnetic strip (1) and the database (5). When a call is made to the remote database by means of the number recorded on the card, a link authentication is performed by comparing the representation of the identifier stored in said database and the actual identifier.

4 Claims, 3 Drawing Sheets

METHOD TO MAKE TRANSACTIONS SECURE BY MEANS OF CARDS HAVING UNIQUE AND NON-REPRODUCIBLE IDENTIFIERS

FIELD OF THE INVENTION

This invention relates to a method making transactions secure by means of bank, loyalty, subscription, or access authorization cards among others, which comprise a magnetic strip, a bar code or an electronic chip as data recording media.

PRIOR ART

The magnetic strip or tape used as a data-recording medium on a card permitting access to various payment, subscription, and database access services, among others, is an extremely common and practical means. In many instances, it does not pose a problem when high security is not required. At the banking level in France, this solution was abandoned and replaced by the chip card or smart card. However, the aforementioned solution is very widespread in all other countries worldwide. Charge-type payment applications such as found in superstores and retail chains use this method. In regard to the bankcard, large security-related problems are associated with the use of magnetic strips. In fact, none of the data stored on a card can be kept secret or made inaccessible. Thus, it becomes possible to create fake cards or to insert false information. In numerous cases, the magnetic strip card is equipped with a PIN code, which permits the level of security to be increased since only the card's owner knows the code; however, experienced swindlers could decipher it even though it would not be a simple task.

SUMMARY OF THE INVENTION

The purpose of this invention is to provide a method permitting the card-based transactions to be made secure at a relatively modest cost that is acceptable to all users. To this end, it utilizes a card-type medium comprising a number and a database linked to a telecommunications network.

The invention is characterized in that an always unique and non-reproducible identifier is physically integrated in the medium comprising the number, in that this identifier constitutes an unforgeable link between the number located on the medium and information stored under the same number in a database, in that the stored information comprises at least one image and/or numeric signature of the unique and non-reproducible identifier, in that the link authentication is effected by means of a comparison between a representation of the identifier stored in said database and the identifier located on the medium, and in that if there is agreement between the two, the transaction is authorized.

Naturally, in addition to the image and/or numeric signature corresponding to the identifier, the database may also comprise other data. As non-limiting examples, this other data could be information pertaining to the cardholder or the object authenticated by this system. In a preferential manner, it may be advantageous to store biometric information about the holder to whom the card was given, such as his/her photograph and/or digital fingerprint and/or DNA and/or iris pattern.

Thus, in one aspect, the invention provides a method enabling generation of a non-forgeable link between the number contained on the card-type medium and information stored under the same number in a secure and remote database. Only the authentication of this unforgeable link can authorize the transaction. The number on the card-type medium may be recorded in various ways. As non-limiting examples, the number may be recorded in a non-encrypted manner, on a magnetic strip or tape, as a two-dimensional or linear bar code, on an electronic chip or on a radio frequency chip. The magnetic strip or bar code options are especially interesting since the number may be automatically read by commonly available and very inexpensive means. Thus, this invention may be implemented by means of readers able to automatically read the number and check the remote database by means of a telecommunications network.

DESCRIPTION OF PREFERRED EMBODIMENTS

Figure 1:
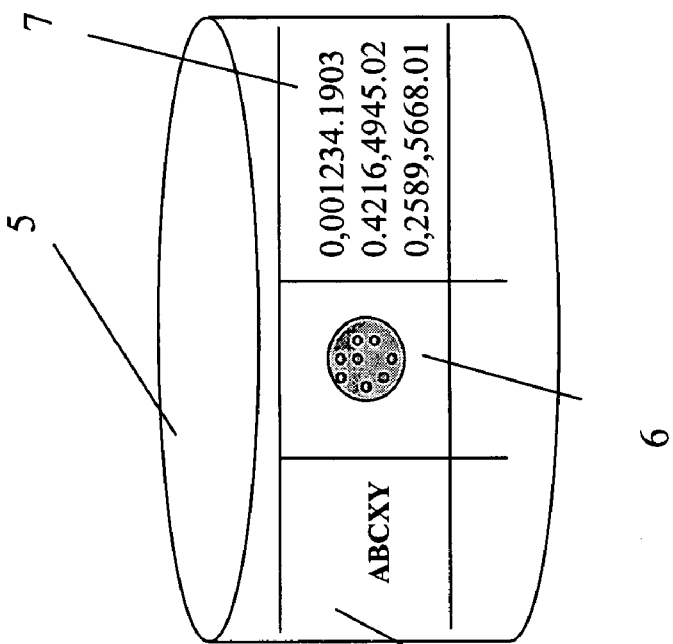
FIG. 1 depicts a diagram of the invention's operating principle.
Figure 1:
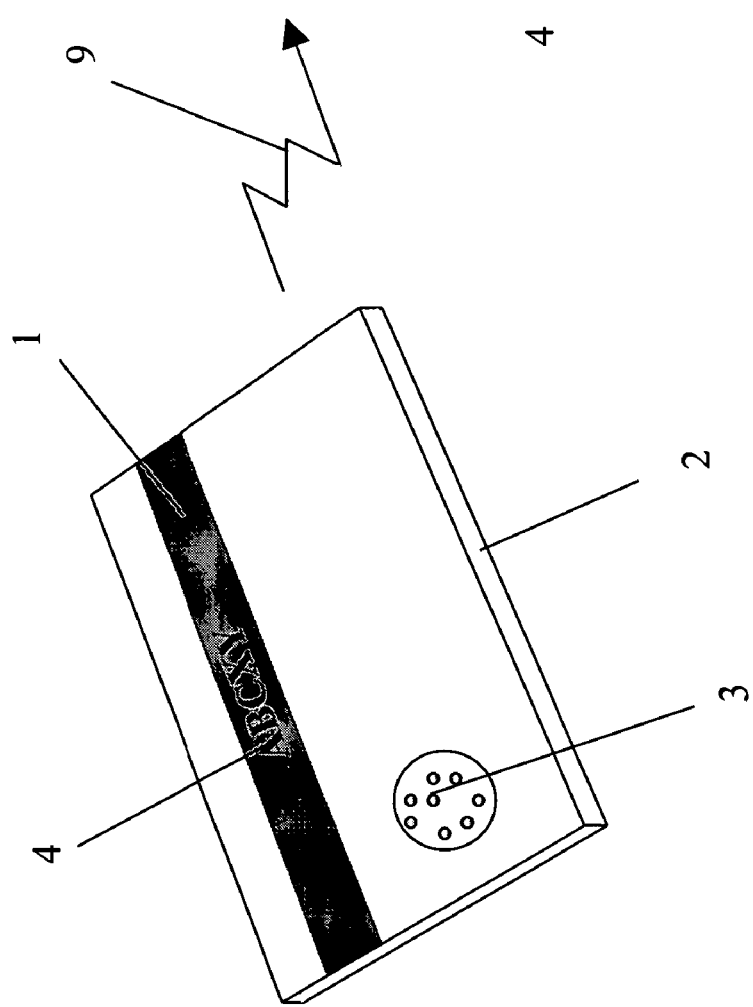

A means of creating the non-forgeable link in accordance with this invention uses a physical identifier. This identifier is physically affixed to the unit bearing the number, for example the familiar, standard format, plastic card. Another characteristic of this procedure is brought about by the fact that the identifier is always unique and non-reproducible and therefore it constitutes an unforgeable link between the number recorded on the card-type medium and the same number contained in the database. To this end, the claim of U.S. patent application Ser. No. 10/182,967, published as US-2003-0014647-A1, by the same applicants and inventors, proposes a volume-based identifier in which three-dimensional bubbles are self-generated and arranged in a random manner that is combined with a reading system that allows extraction of a signature and demonstrates its three-dimensionality. This procedure and this form of identification are perfectly suited for this application but other procedures having similar characteristics might also be suitable. For example, an electronic chip may be the unforgeable link; however, in this case, the level of security will depend directly on cost, and in an extreme case, this relationship would not make economic sense because the chip would be able to completely replace the magnetic strip. In order to make the procedure more secure, with minimal operational costs and acceptable infrastructure, the applicant has conducted extensive research and according to another especially innovative and inventive characteristic, whereby the authentication procedure of the unforgeable link may be visual.

To this end, a volume-based identifier containing self-generated bubbles arranged in a random and non-reproducible manner in a transparent substance is one means suitable to create an unforgeable link. Said bubble identifier, whose identical reproduction is impossible, is affixed on the card-type medium comprising the number. An image of the identifier, in which the bubbles and their form, size, and relative position are clearly perceived, is stored in the database under the same number as the one recorded on the magnetic strip or any other recording means. When the operator calls the database thanks to the number recorded on the card, for example on the magnetic strip, it appears on the monitor or printed directly on a tag, with the image still stored on the remote database. All one has to do is visually compare the actual and non-reproducible identifier affixed to the card-type medium to the image received. The operator can then authenticate the link and declare the transaction as valid. Thus, this visual link authentication solution may be implemented very quickly by means of existing infrastructures and therefore without additional investments. Only the card-type media comprising the bubble volume-based identifier incur additional identifier-related costs. In this case, for the authentication to be complete, the operator must ensure that the identifier is three-dimensional.

According to another characteristic, the non-falsifiable link authentication procedure may be automatic. In this case, the card comprising the number and the unique and non-reproducible identifier has the number and the identifier read by means of a reader comprising the mean(s) adapted for reading. The part of the reader integrating the read mode of the unique and non-reproducible identifier can analyze and decide on the identifier's characteristic elements, thereby making the identifier non-reproducible. It can also extract the image allowing the signature or code to be calculated. This signature or code may be calculated on-site or in the database after sending the image according to the desired configuration. In a practical manner, when the operator calls up the database for the number recorded on the card, the integrated reader simultaneously captures the identifier; the identifier's image or its representation is then transmitted to the remote database and a computation of the corresponding image signature is performed and compared to that stored in said database. If there is agreement, link authentication exists and the transaction is authorized. In this case, the three-dimensional image of the identifier may be verified by subjecting it to different lighting.

When a bubble identifier is utilized as an unforgeable link, the three-dimensionality of this identifier enables the generation of shadows and/or reflections occupying different positions as a function of the lighting angles. As a result, the same identifier generates a plurality of image signatures. These images comprising different shadows or reflections may be stored in the remote database and used depending on the security level required in transactions. For example, when the identifier is read, the reader may capture an image from one lighting angle and request the database to return the stored image or digital signature corresponding to the same lighting angle.

If the unforgeable identifier is comprised of self-generated bubbles, it is preferable to record the number on the card-type medium in the form of a two-dimensional data matrix-type code. Thus, the same optical reader device will be able to read the identifier's image and the number stored in the two-dimensional code. In this case, one would therefore preferentially arrange the identifier and the two-dimensional code in a preferential manner on the card, in such a way as to allow reading them both in the same operation.

In order to authenticate an identifier, we can access the database with a mobile phone. In that case, the address number is sent to the database through the keyboard of said phone and by return the picture image of the identifier is sent back onto the phone display. The operator can then authenticate by checking the match between the picture signature on the display and the identifier. In case of a three dimensional identifier, the operator will also have to check the volumic aspect of the latter.

According to another embodiment of the invention the last generation of mobile phones equipped with digital cameras can be used as an identifier reader.

FIG. 1 represents a diagram of the invention's operating principle. A medium (2) that may be an ISO-format magnetic strip plastic or paper card comprises an identifier (3), whose characteristic elements are always unique and unforgeable, is physically affixed to it. The magnetic strip comprises an encoded number (4). A representation in the form of an image (6) and a digital code (7), for example, is stored in a remote database (5) that is accessed by telephone, Internet, cable line or radio at the same number (4) as that recorded on the magnetic strip (1). This identifier (3) constitutes the unforgeable link, due to its uniqueness and non-reproducibility, between the magnetic strip (1) comprising the number (4) and the same number (4) located in the database (5) to which corresponds a representation of said identifier in the form of an image (6) and a digital signature (7). To validate a transaction with certainty at the time of a call (9), one must establish agreement between the physical identifier (3) and one of its image (6) or digital (7) representations in the remote database (5).

Figure 2:
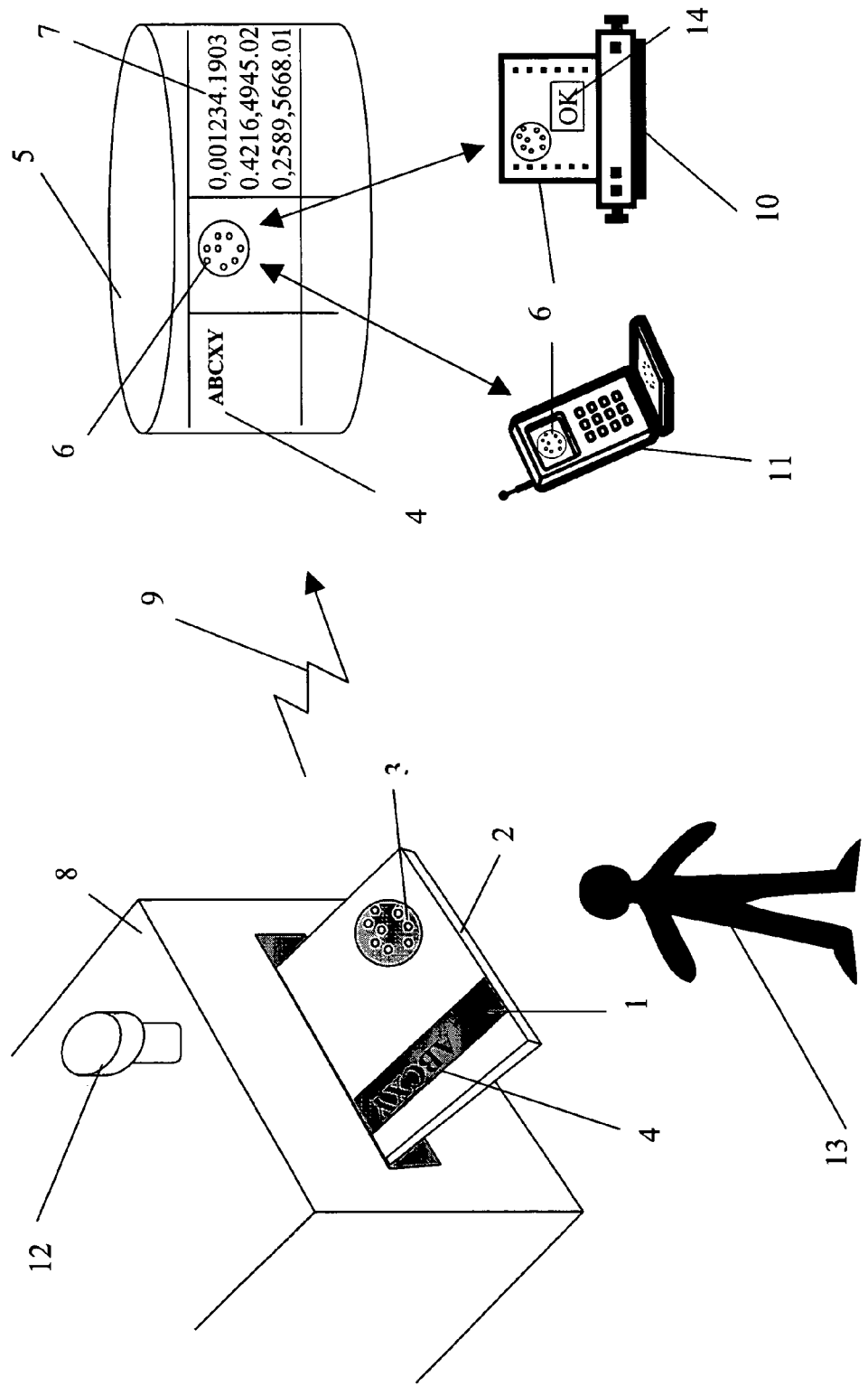
FIG. 2 depicts a diagram of the operation in the visual and automatic modes.
Figure 3A:
FIG. 3 represents an embodiment of a unique and unforgeable identifier.
Figure 3B:
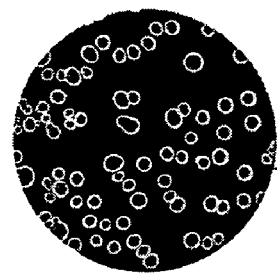
Figure 3B:
Figure 3B:
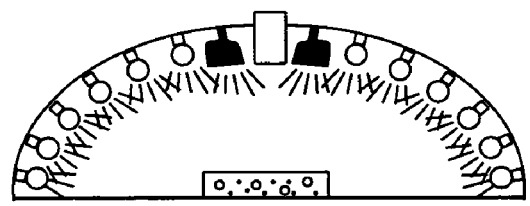
Figure 3C:
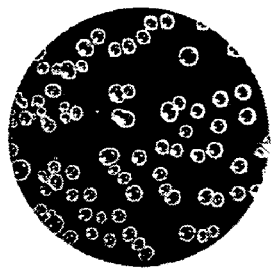
Figure 3C:
Figure 3C:
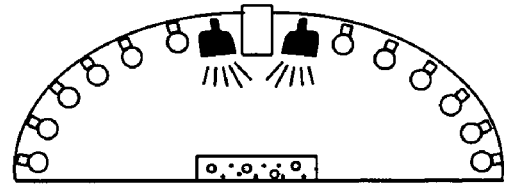

FIG. 2 represents the visual and automatic functioning modes. In the visual mode, a human operator (13) inserts into a magnetic reader (8) a card (2) provided with a magnetic strip (1) and a bubble identifier (3) whose characteristic feature is that it is always unique and non reproducible. After reading of the number (4) recorded on the magnetic strip (1) is completed, a call (9) is made to the database (5). At least one image signature (6) and one digital representation (7) are already stored at this same number (4). The stored image signature (6) is re-transmitted to a terminal monitor (11) and/or a printer (10) on which the image (6) appears. The operator makes a visual comparison between the bubble identifier (3) and its image (6) displayed on the terminal (11) and/or on the receipt of the printer (10). If there is visual agreement, this means that the link's authentication is established and the operator (13) may validate the transaction.

In the automatic mode, a card (2), bearing a magnetic strip (1) and a bubble identifier (3) characterized by always being unique and non reproducible, is inserted into a device comprising a magnetic reader (8) and a bubble identifier-capturing device. When the capturing device (12) finishes reading the number (4) contained on the magnetic strip and reading the volume-based authentication of the bubble identifier (3), the image is captured and sent via (9) toward the database (5) to the number (4). A comparison is made between the image received by the database and that stored at the same number (4). Naturally, the comparison may also be performed by means of digital signatures. In an autonomous manner, the database establishes agreement between the received and stored signatures. If they are identical, a message (14) appears on the terminal (10) signifying that the link authentication is established and that the transaction is validated.

In the visual mode as in the automatic mode, a secret code (PIN: Personal Identification Number) may be used. To access the database after reading the number in the magnetic strip. In particular, this PIN code allows one to verify that the cardholder is indeed its owner.

It is obvious that in the automatic mode, numerous alternative solutions are conceivable without deviating from this invention. For example, the comparison of the image or digital signatures may be performed directly by the reader if it is known that it is secure. Conversely, the comparison may also be made at the database-level. In the same manner, verification of the identifier's three-dimensional image may be performed either by the scanner or the database or by the operator.

FIG. 3 represents a unique non reproducible identifier in which bubbles having shapes and holding random positions are self-generated. This bubble identifier is especially well suited to make applications secure in accordance with this invention. FIG. 3a depicts a view of the identifier in which the bubbles are perceived in their three-dimensional volume arrangement. FIG. 3b depicts a top-view of the identifier subjected to diffuse lighting and displaying the only two-dimensional image. FIG. 3c depicts a top view of the identifier subjected to point lighting and displaying generated reflections thereby proving its three-dimensionality. Depending on the lighting angle, the position of the generated reflection changes thereby constituting a plurality of signatures.

The invention claimed is:

1. Method for making transactions secure based on a card-type medium (2) comprising a number (4) and a remote database (5) connected to a telecommunications network (9), characterized in that
 a unique volume based identifier (3) containing bubbles of random size, shape and arrangement which are clearly perceived in form size and relative position is physically integrated in the medium (2) comprising the number (4),
 this identifier (3) constitutes an unforgeable link between the number (4) located on the medium and information stored under the same number (4) in the database (5),
 said stored information comprises at least one representation of the identifier comprising an image (6) of the unique identifier (3),
the method comprising authenticating the link at the time of a transaction by
 making a call to the database,
 retransmitting the stored image to a terminal monitor (11) and/or a printer (10) on which the image appears, and
 a human operator;
 visually comparing the identifier (3) located on the medium and its image displayed on the terminal (11) and/or on the receipt of the printer (10), and
 determining if there is agreement between the identifier (3) located on the medium and its image displayed on the terminal (11) and/or on the receipt of the printer (10) and either,
 authorizing the transaction if agreement is determined, or
 not authorizing the transaction if non-agreement is determined.

2. Method for making transactions secure based on a card-type medium (2) comprising a number (4) and a remote database (5) connected to a telecommunications network (9) according to claim 1, characterized in that the number is recorded on the medium (2) by means of a magnetic strip or tape (1).

3. Method for making transactions secure based on a card-type medium (2) comprising a number (4) and a remote database (5) connected to a telecommunications network (9) according to claim 1, characterized in that the number is recorded in the medium (2) by means of a linear bar code or a two-dimensional code (1).

4. Method for making transactions secure based on a card-type medium (2) comprising a number (4) and a remote database (5) connected to a telecommunications network (9) according to claim 1, characterized in that the number is recorded on the medium (2) by means of an electronic chip or radio frequency chip.

* * * * *

UNITED STATES PATENT AND TRADEMARK OFFICE
CERTIFICATE OF CORRECTION

PATENT NO. : 7,647,279 B2
APPLICATION NO. : 10/712659
DATED : January 12, 2010
INVENTOR(S) : Bourrieres et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1285 days.

Signed and Sealed this

Sixteenth Day of November, 2010

David J. Kappos
*Director of the United States Patent and Trademark Office*